(12) United States Patent
Kozyuk (10) Patent No.: US 7,247,244 B2
(45) Date of Patent: Jul. 24, 2007

(54) WATER TREATMENT PROCESSES AND DEVICES UTILIZING HYDRODYNAMIC CAVITATION

(75) Inventor: Oleg V. Kozyuk, Westlake, OH (US)

(73) Assignee: Five Star Technologies, Inc., Cleveland, OH (US)

( * ) Notice: Subject to any disclaimer, the term of this patent is extended or adjusted under 35 U.S.C. 154(b) by 167 days.

(21) Appl. No.: 10/969,139

(22) Filed: Oct. 20, 2004

(65) Prior Publication Data
US 2006/0081541 A1  Apr. 20, 2006

(51) Int. Cl.
C02F 1/32 (2006.01)
C02F 1/72 (2006.01)

(52) U.S. Cl. .................. 210/748; 210/759; 210/760
(58) Field of Classification Search .............. 210/748, 210/758–760, 766
See application file for complete search history.

(56) References Cited

U.S. PATENT DOCUMENTS

| | | |
|---|---|---|
| 4,906,387 A | 3/1990 | Pisani |
| 4,990,260 A | 2/1991 | Pisani |
| 5,326,468 A | 7/1994 | Cox |
| 5,393,417 A | 2/1995 | Cox |
| 5,494,585 A | 2/1996 | Cox |
| 5,762,808 A | 6/1998 | Peyton |
| 5,810,052 A | 9/1998 | Kozyuk |
| 5,855,775 A | 1/1999 | Kerfoot |
| 5,937,906 A | 8/1999 | Kozyuk |
| 5,969,207 A | 10/1999 | Kozyuk |
| 5,971,601 A | 10/1999 | Kozyuk |
| 6,012,492 A | 1/2000 | Kozyuk |
| 6,035,897 A | 3/2000 | Kozyuk |
| 6,083,407 A | 7/2000 | Kerfoot |
| 6,117,334 A | 9/2000 | Coury et al. |
| 6,139,755 A | 10/2000 | Marte et al. |
| 6,200,486 B1 | 3/2001 | Chahine et al. |
| 6,221,260 B1 | 4/2001 | Chahine et al. |
| 6,361,697 B1 | 3/2002 | Coury et al. |
| 6,502,979 B1 | 1/2003 | Kozyuk |
| 2002/0096456 A1 | 7/2002 | Kim et al. |
| 2004/0022122 A1 | 2/2004 | Kozyuk |

OTHER PUBLICATIONS

International Search Report; U.S. Patent Office; Authorized Officer Savage, M; Issued Jul. 24, 2006.

Primary Examiner—Matthew O. Savage
(74) Attorney, Agent, or Firm—Benesch, Friedlander, Coplan & Aronoff LLP (57) ABSTRACT

Processes and devices associated with reducing the amount of organic substances in a fluid are described. In one example method, oxidizing agents may be introduced into a local constriction of flow in a flow-through chamber as the fluid is flowed therethrough. Cavitation bubbles which contain and/or are associated with the oxidizing agents may form. Collapse of the cavitation bubbles may produce pulses of ultraviolet light, thereby ionizing the oxidizing agents, producing hydroxyl radicals, and degrading and/or oxidizing the organic substances in the fluid. An example device may include a flow-through chamber including a local constriction of flow, a port configured to introduce oxidizing agents into the local constriction of flow, and may include an area configured to collapse the cavitation bubbles, thereby initiating events leading to degradation and/or oxidation of organic substances in a fluid flowed through the device.

20 Claims, 5 Drawing Sheets

Figure 5

WATER TREATMENT PROCESSES AND DEVICES UTILIZING HYDRODYNAMIC CAVITATION

BACKGROUND

Organic substances in fluids may be removed from the fluids by combining oxidizing agents and ultraviolet light in a process called ultraviolet oxidation. Ultraviolet oxidation may be used, for example, to treat contaminated groundwater, wastewater, aqueous fluids from manufacturing processes, and the like, to break chemical bonds within the organic substances and/or to oxidize the organic substances. The ultraviolet oxidation process generally may result in destroying and/or oxidizing the organic substances with little or no generation of toxic by-products.

Generally, ultraviolet oxidation may involve the action of ultraviolet light on oxidizing agents to produce hydroxyl radicals. The hydroxyl radicals may degrade and oxidize organic substances. To produce enough hydroxyl radicals to degrade and/or oxidize the organic substances, a sufficient concentration of oxidizing agent capable of being irradiated may be necessary. In some instances, it may be that the concentration of oxidizing agents is too low for ultraviolet light irradiation to produce levels of hydroxyl radicals that affect substantial amounts of organic substances.

BRIEF DESCRIPTION OF THE DRAWINGS

The accompanying drawings, which are incorporated in and constitute a part of the specification, illustrate various example methods, systems, and so on, relating to various example embodiments of cavitation-based fluid treatment. The drawings are for the purposes of illustrating the preferred and alternate embodiments and are not to be construed as limitations. For example, it will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale and distances may be exaggerated for purposes of explanation.

DETAILED DESCRIPTION

This application describes methods and systems related to cavitation-based fluid treatment. The example methods and systems may relate to introducing oxidizing agents into or near an area of a fluid where cavitation bubbles are formed by hydrodynamic cavitation. In one example, the oxidizing agents may be introduced into or near a local constriction of flow, through which a fluid flows. The local constriction of flow may produce areas of low pressure in the fluid, resulting in production of cavitation bubbles that contain, envelope and/or are associated with relatively high levels of oxidizing agents. The example methods and systems may also relate to collapsing or imploding the cavitation bubbles in a zone of increased pressure, for example. Collapse of the cavitation bubbles may produce ultraviolet oxidation of organic substances in the fluid. In one example, collapsing the cavitation bubbles may produce ultraviolet light or ultraviolet radiation as well as other high energy conditions such as shearing, high pressure, heat, mechanical vibration, noise, and possibly other local energy conditions. These localized high energy conditions may facilitate breakdown of the organic substances. In one example, the ultraviolet light may facilitate one or more of, breakage of chemical bonds, activation and/or ionization of oxidizing agents, production of hydroxyl radicals, and oxidation or partial oxidation of the organic substances.

Figure 1:
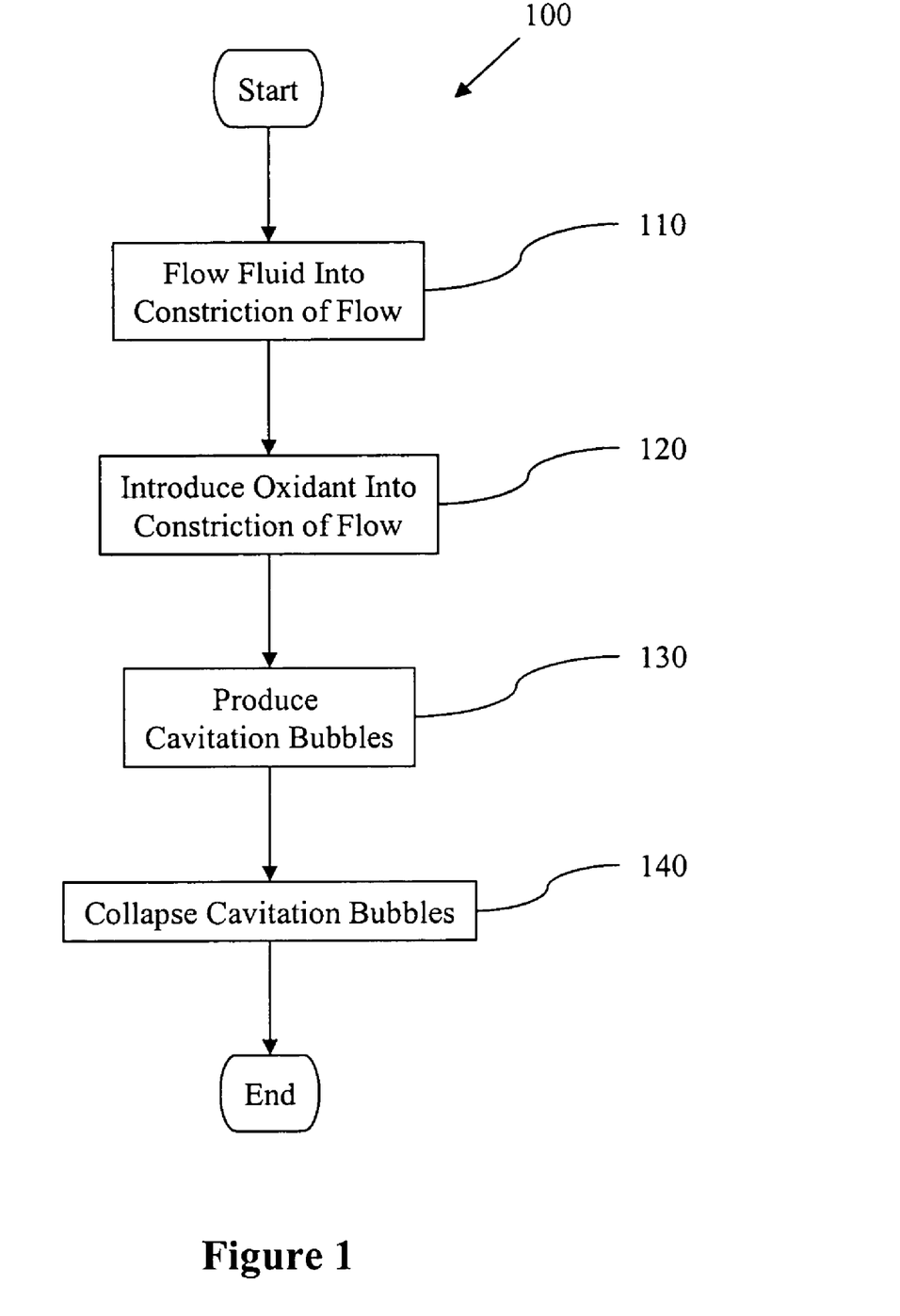
FIG. 1 is a flow diagram illustrating an example method 100 for cavitation-based fluid treatment.

FIG. 1 is a flow diagram illustrating an example method 100 for cavitation-based fluid treatment. Method 100 may include, at 110, flowing a fluid containing organic compounds into a local constriction of flow. Method 100 may also include, at 120, introducing one or more oxidizing agents into the local constriction of flow. Method 100 may also include, at 130, producing cavitation bubbles containing and/or associated with the oxidizing agents. Method 100 may also include, at 140, collapsing the cavitation bubbles.

The method 100 may include creating cavitation bubbles in a fluid containing contaminating or undesired organic compounds by hydrodynamic cavitation. Hydrodynamic cavitation may include producing cavitation bubbles (block 130) in the fluid by creating low pressure in the fluid. The low pressure may be created in a localized area of the fluid by the local constriction of flow as the fluid flows therethrough (block 110). The local constriction of flow may include one or more baffles, orifices, Venturi tubes, nozzles, slots, and the like. Hydrodynamic cavitation may also include collapsing the cavitation bubbles (block 140), thereby producing local energy conditions like heating, high pressure, ultraviolet light, and so on, that may lead to ultraviolet oxidation, including chemical bond breakage and/or oxidation or partial oxidation of the organic compounds. Collapsing the cavitation bubbles may occur in a zone or area of high or elevated pressure.

While not wishing to be bound by theory, it is believed that after a fluid flows through a local constriction, there may be an area downstream of the local constriction where cavitation bubbles are in the process of forming. The area where cavitation bubbles are in the process of forming may be called a hydrodynamic cavitation cavern. At the end of this area, completely formed cavitation bubbles may be found. The area where completely formed cavitation bubbles are found may be called a cavitation field. Introducing one or more oxidizing agents into a local constriction of flow (block 120) may include introducing the oxidizing agents into the fluid at a location along the hydrodynamic cavitation cavern. This may include, for example, introducing the oxidizing agents into a fluid at the local constriction of flow, at a location between the local constriction and the cavitation field, or even at the location of the cavitation field. This may also include introducing the oxidizing agents into a fluid in an area that is immediately upstream of the local constriction. Introducing oxidizing agents into the fluid in one or more of these areas generally may result in a relatively high local concentration of the oxidizing agents in the fluid as the fluid is in the process of forming cavitation bubbles. This may result in production of cavitation bubbles that contain and/or are associated with concentrations of oxidizing agents sufficient to produce levels of hydroxyl radicals that may degrade and/or oxidize organic compounds in the fluid when the cavitation bubbles collapse.

Oxidizing agents may be contained or enveloped within cavitation bubbles, and/or be associated with the cavitation bubbles. "Associated with" may include oxidizing agents that contact or are part of the interior or exterior surfaces of the cavitation bubbles (e.g., the "walls" of the cavitation bubble), or are part of the walls themselves. The area that includes the interior and exterior surfaces may be called boundary layers of the cavitation bubbles.

The rate at which oxidizing agents may be introduced into or near a local constriction of flow may be based, at least in part, on the volume of the fluid containing organic compounds that flows through the local constriction of flow. The amount of oxidizing agents introduced into a local constriction of flow generally may be an amount that yields cavitation bubbles containing or associated with a level of the oxidizing agents that may result in an amount of hydroxyl radicals sufficient for destroying, degrading and/or oxidizing organic compounds in the fluid when the cavitation bubbles collapse. This rate at which oxidizing agents may be introduced may be determined empirically, based on studies exemplified in Example 1 discussed below. The rate of introduction and the amount of oxidizing agents introduced may also be determined based on a variety of other factors, including one or more of, the concentration of organic substances in a fluid, the cost of oxidizing agents, the particular system used to perform the method, the amount of reduction in the organic substances desired, and others.

A variety of oxidizing agents may be used. In one example, the oxidizing agents may include one or more of, a gas, a vapor, and a liquid. In one example, the oxidizing agents may include one or more of, hydrogen peroxide, peroxide salts, potassium permanganate, active oxygen, ozone, and others.

The organic compounds that may be treated using the methods may include, for example, one or more of, petroleum hydrocarbons, halogenated solvents, phenols, chlorophenols, pentachlorophenols, pesticides, dioxins, glycols, polychlorinated biphenyls, explosives, creosote, Freon 113, vinyl chloride, benzenes, chlorobenzenes, toluene, ethylbenzene, xylenes, methyl tertiary butyl ether, cyanide, mixed organic and radioactive waste, and others. The solutions that may contain these organic compounds may be, for example, wastewater, groundwater, solutions from manufacturing processes, and others.

Figure 2:
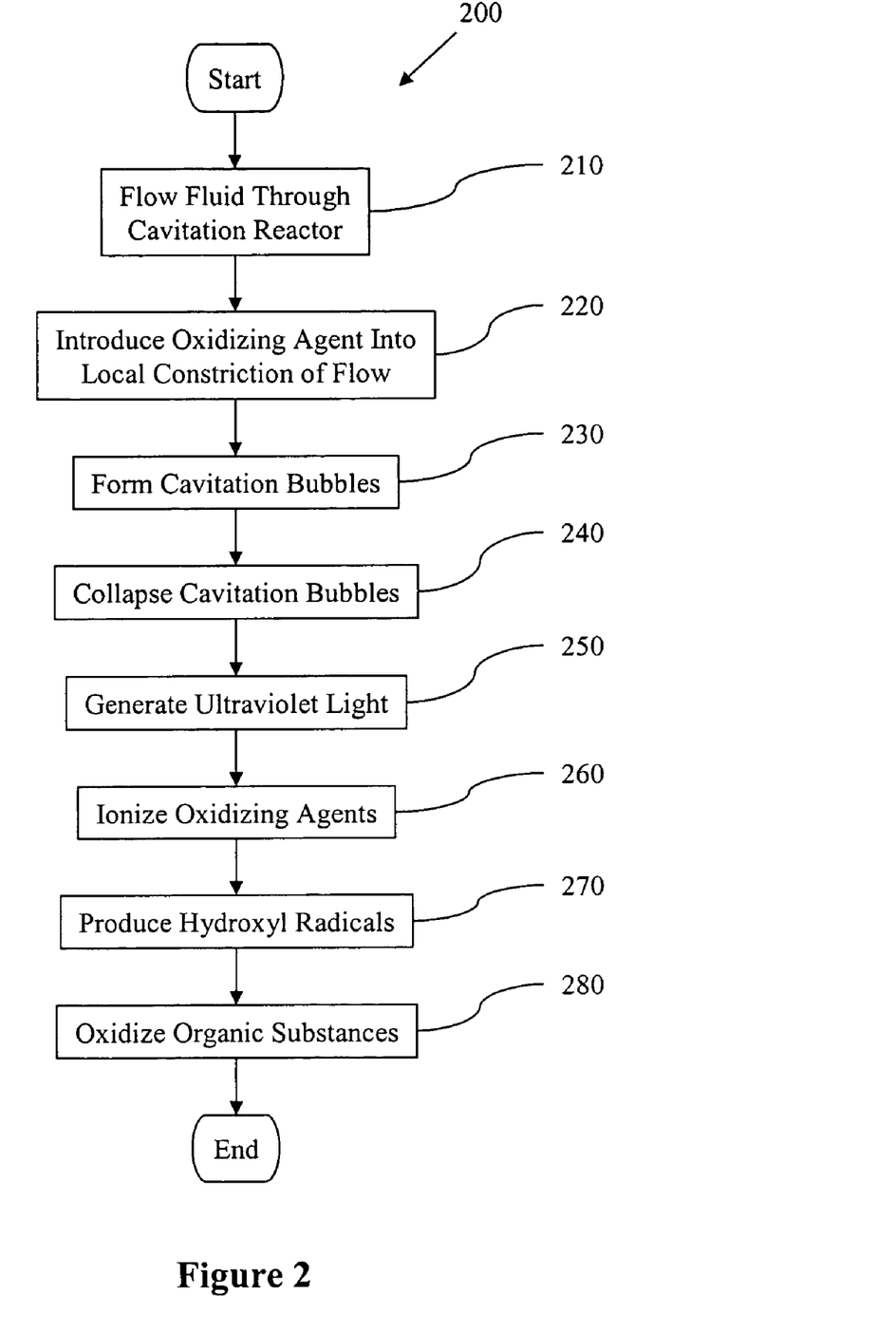
FIG. 2 is a flow diagram illustrating an example method 200 for cavitation-based fluid treatment.

FIG. 2 is a flow diagram illustrating an example method 200 for cavitation-based fluid treatment. Method 200 may include, at 210, flowing a fluid containing organic compounds through a cavitation reactor. The cavitation reactor may include one or more areas of locally-constricted flow. Method 200 may also include, at 220, introducing an oxidizing agent into the cavitation reactor. The oxidizing agent may be introduced into the cavitation reactor at or near the locally-constricted area. Method 200 may also include, at 230, forming cavitation bubbles that contain and/or are associated with oxidizing agents. Method 200 may also include, at 240, collapsing or imploding the cavitation bubbles. Method 200 may also include, at 250, generating light pulses. The light generated may be ultraviolet light. Method 200 may also include, at 260, ionizing at least some of the oxidizing agents. Method 200 may also include, at 270, producing hydroxyl radicals. Method 200 may also include, at 280, oxidizing at least some of the organic compounds in the solution.

Cavitation bubbles generally contain gases and vapors. Collapsing the cavitation bubbles may produce localized high energy conditions like high pressures, high temperatures, and others. When gases are heated to high temperatures, as may happen to gases within cavitation bubbles when the cavitation bubbles collapse, plasmas may be created. The plasmas may emit ultraviolet light. The ultraviolet light may be emitted as pulses. Emission of this ultraviolet light may be called cavitation luminescence. The ultraviolet light may irradiate oxidizing agents contained within and/or associated with the cavitation bubbles. Irradiating oxidizing agents may produce ionization of the oxidizing agents. Irradiating oxidizing agents may produce hydroxyl radicals. The hydroxyl radicals may contact and/or react with organic compounds in a fluid or solution in which the cavitation bubbles are produced. These reactions may destroy or degrade the organic compounds, through breakage of chemical bonds within the compounds, for example. These reactions may produce partial oxidation of the organic compounds. These reactions may produce complete oxidation of the organic compounds, to carbon dioxide and water, for example. The fluid or solution that has been treated by the cavitation-based methods may be called a product of the methods.

Figure 3:
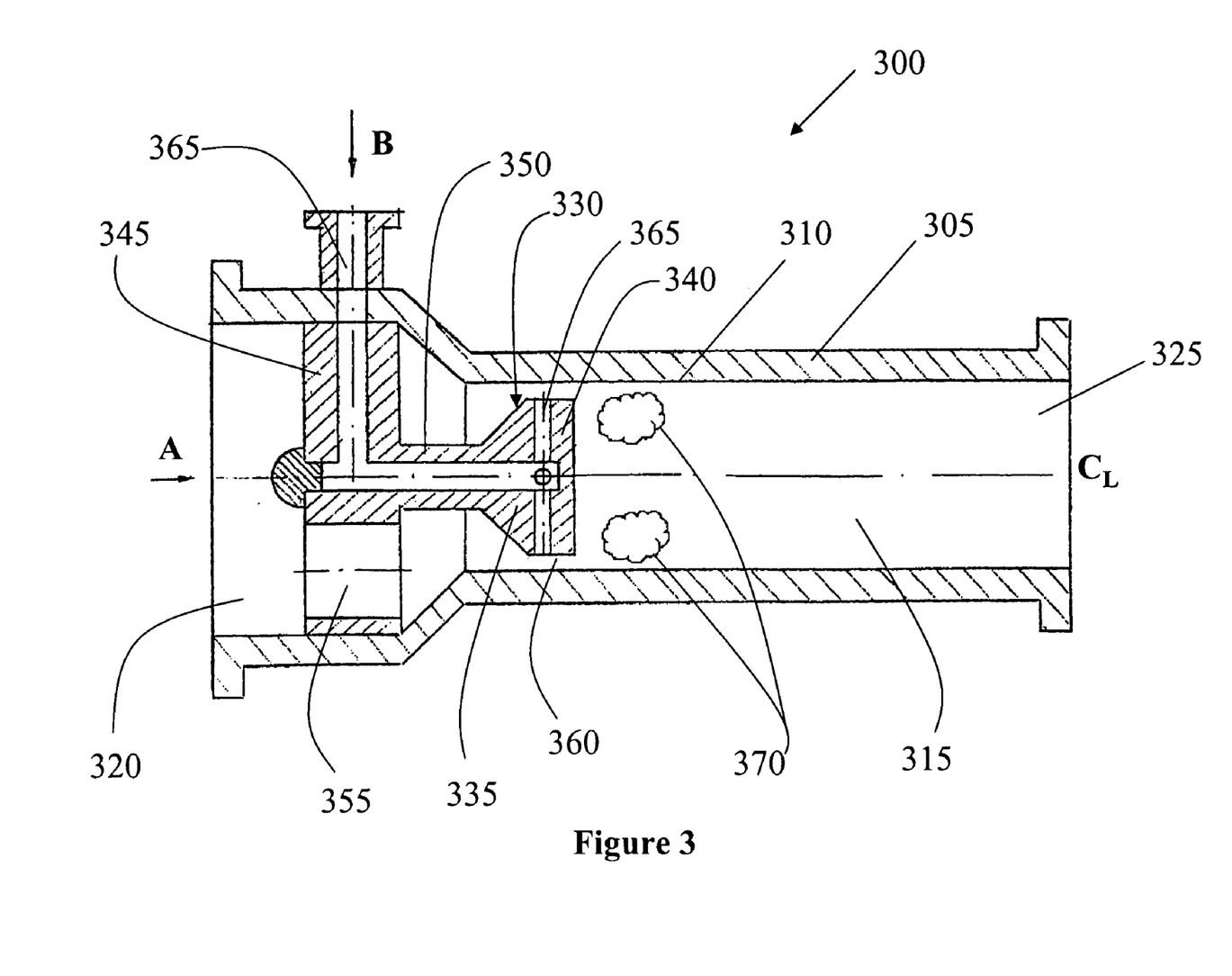
FIG. 3 illustrates a longitudinal cross section of an example device 300 for cavitation-based fluid treatment.

FIG. 3 illustrates a longitudinal cross section of an example device 300 for cavitation-based fluid treatment. The example device 300 includes a wall 305 having an inner surface 310 that defines a flow-through channel or chamber 315 having a centerline $C_L$. For example, the wall 305 may be a cylindrical wall that defines a flow-through channel 315 having a circular cross-section. It will be appreciated that the cross-section of flow-through channel 315 may take the form of other geometric shapes such as square, rectangular, hexagonal, or any other complex shape. The flow-through channel 315 may further include an inlet 320 configured to introduce a fluid into the device 300 along a path represented by arrow A and an outlet 325 configured to exit the fluid from the device 325.

With further reference to FIG. 3, in one example, the device 300 may include one or more cavitation generators that generate a cavitation field downstream from the cavitation generator. For example, the device 300 may include a cavitation generator that includes a baffle 330. It will be appreciated that more than one cavitation generator may be provided within the flow-through channel 315. Furthermore, it will be appreciated that other types of cavitation generators may be used instead of baffles, such as Venturi tubes, nozzles, orifices, slots, and so on.

To vary the degree and character of the cavitation fields generated downstream from the baffle 330, the baffle 330 may be embodied in a variety of different shapes and configurations. For example, the baffle 330 may be conically shaped, including a conically-shaped surface 335 that extends into a cylindrically-shaped surface 340. The baffle 330 may be oriented so that the conically-shaped portions 335 confront the fluid flow. It will be appreciated that the baffle 330 may be embodied in other shapes and configurations such as the ones disclosed in U.S. Pat. No. 5,969,207, which is hereby incorporated by reference in its entirety herein.

To retain the baffle 330 within the flow-through channel 315, the baffle 330 may be connected to a plate 345 via a shaft 350. It will be appreciated that the plate 345 may be embodied as a disk when the flow-through channel 315 has a circular cross-section, or the plate 345 may be embodied in a variety of shapes and configurations that may match the cross-section of the flow-through channel 315. The plate 345 may be mounted to the inside surface 310 of the wall 305 with screws or other attachment means. The plate 345 may include one or more orifices 355 configured to permit fluid to pass therethrough. It will be appreciated that a crosshead, post, propeller or other fixture that produces a minor loss of liquid pressure can be used instead of the plate 345 having orifices 355.

In one example, the baffle 330 may be configured so that a local constriction 360 is present. Flow of fluid through the local constriction 360 may produce one or more hydrodynamic cavitation fields 370 downstream from the baffle 330. Cavitation fields 370 include an area where formed cavitation bubbles are found. For example, the local constriction 360 of liquid flow may be an area defined between the inner surface 310 of the wall 305 and the cylindrically-shaped surface 340 of the baffle 330. Thus, if the flow-through channel 315 has a circular cross-section, the local constriction 360 of liquid flow may be characterized as an annular orifice. It will be appreciated that if the cross-section of the flow-through channel 315 is a geometric shape other than circular, the local constriction of flow may not be annular in shape. Likewise, if a baffle is not circular in cross-section, then the corresponding local constriction of flow may not be annular in shape.

With further reference to FIG. 3, the flow-through channel 315 may further include a port or inlet 365 for introducing an oxidizing agent into the flow-through channel 315 along a path represented by arrow B. Generally, the port 365 may introduce the oxidizing agents into the flow-through channel at or near the local constriction 360 of flow. In the illustrated example, the port 365 may be configured to permit the introduction of the oxidizing agent into the fluid in the local constriction 360 of flow. It will be appreciated that the port 365 may be configured to introduce oxidizing agents into the flow-through channel 315 not only at the local constriction 360 of flow, but along an area between and including the local constriction 360 of flow and the area of the flow-through channel 315 where cavitation bubbles are formed. This area where cavitation bubbles are formed may be called a cavitation field 370. This area includes the vena contracta, the area immediately downstream from the local constriction 360 of flow. It will also be appreciated that the port 365 may be configured to introduce oxidizing agents into the fluid at one or more points immediately before the fluid enters into the local constriction 360 of flow.

The one or more points or locations at which oxidizing agents are introduced into the fluid generally may be positioned so that cavitation bubbles contain and/or are associated with levels of oxidizing agents that are in an amount that leads to hydroxyl radicals when the cavitation bubbles collapse. The amount of hydroxyl radicals generally may be capable of degrading and/or oxidizing organic compounds in a fluid. While not wishing to be bound by a theory, it is believed that cavitation bubbles may be forming in the area located between and including, the local constriction 360 of flow and the cavitation field 370, and that introduction of oxidizing agents into and/or immediately upstream of this area may result in significant amounts of oxidizing agents contained within and/or associated with the cavitation bubbles.

In operation of device 300 illustrated in FIG. 3, fluid may enter the flow-through channel 315 via the inlet 320 and flow through the orifice 355 in the plate 345 along the fluid path A. The fluid may be fed through the flow-through channel 315 and maintained at a flow rate sufficient to generate hydrodynamic cavitation fields downstream from the baffle 335. As the fluid flows through the flow-through channel 315, the oxidizing agents may be introduced into the local constriction 360 via the port 365, thereby mixing the oxidizing agents with the fluid as the fluid passes through the local constriction 360.

In one example, the oxidizing agent may be introduced into the fluid in the local constriction 360 and may be maintained at a flow rate different from the fluid flow rate. For example, a ratio between the oxidizing agent flow rate and the fluid flow rate may be about 0.1 or less. In other words, the ratio between the fluid flow rate and the oxidizing agent flow rate may be at least about 10.

While passing through the local constriction 360, the velocity of the fluid may increase to a minimum velocity (i.e., velocity at which cavitation bubbles begin to appear) dictated by the physical properties of the fluid. The increased velocity of the fluid may form the hydrodynamic cavitation field 370 downstream from the baffle 330, thereby generating cavitation bubbles that contain and/or are associated with the oxidizing agents. Upon reaching an elevated static pressure zone (not shown), which may be part of the device 300 or may be outside of the device 300, the cavitation bubbles may collapse, thereby producing one or more local high energy conditions, including heating, shearing, and others. Pulsed ultraviolet light may also be produced. One or more of the high energy conditions may cause one or more of, ionization of oxidizing agents, production of hydroxyl radicals, and degradation and/or oxidation of organic substances that may be present in the fluid. The fluid may exit the flow-through channel 315 via the outlet 325.

Figure 4:
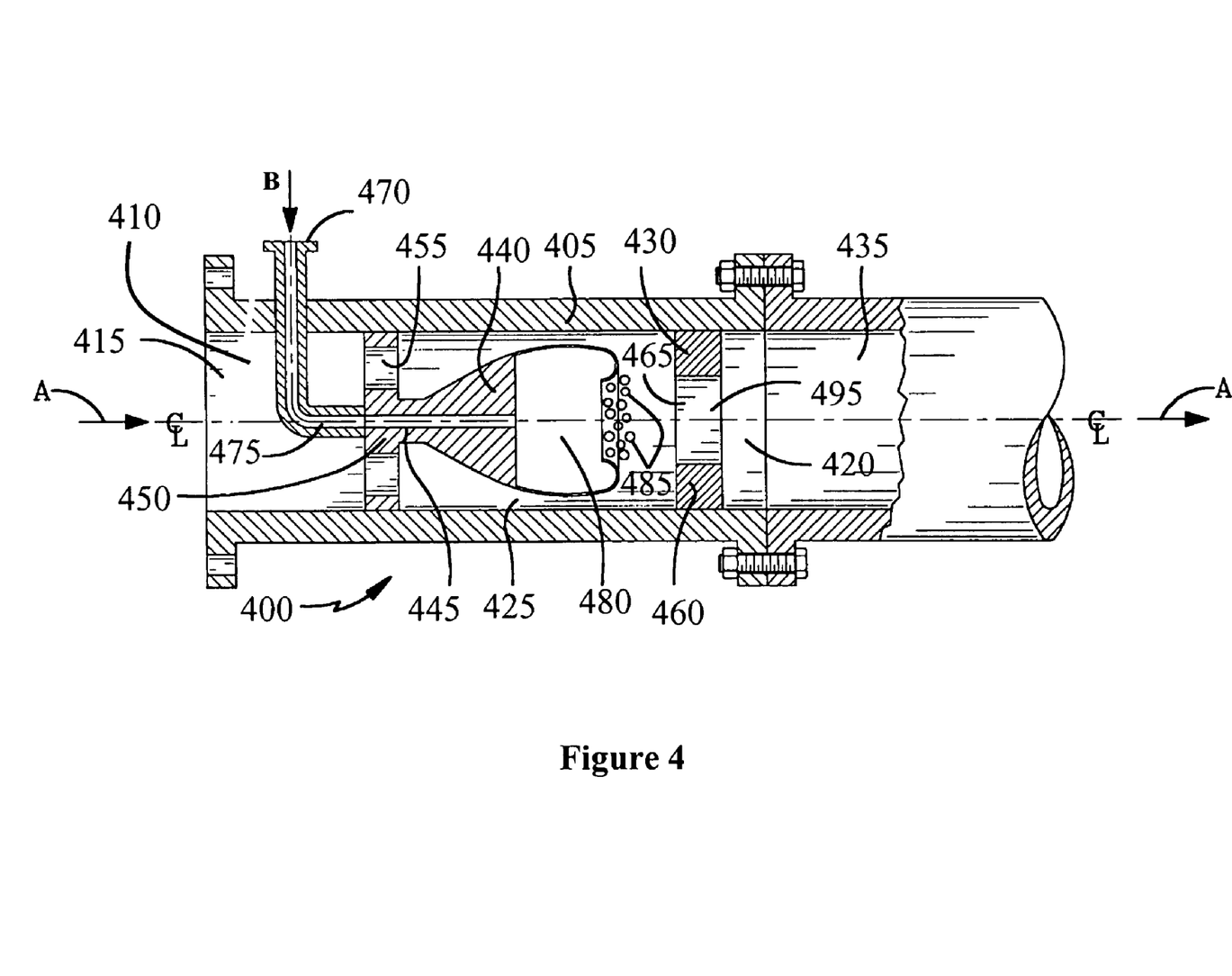
FIG. 4 illustrates a longitudinal cross section of an example device 400 for cavitation-based fluid treatment.

FIG. 4 illustrates a longitudinal cross section of an example device 400 for cavitation-based fluid treatment. The device 400 may include a wall 405 defining a flow-through channel 410 including an inlet 415, an outlet 420 and a local constriction 425 of fluid flow. At the outlet 420 from the flow-through channel 410, local hydraulic resistance 430, which may lead to production of a static pressure zone, may be positioned. Outlet 420 may be connected with a pipeline 435.

Local constriction 425 of flow may be formed by a bluff body 440 positioned inside the flow-through channel 410 along or near the centerline CL. Bluff body 440 may be positioned on a stem 445, which may be connected with a disk 450 that includes one or more orifices 455. In one example, the sizes of the local constriction 425 of the fluid flow may be set in a manner so that the cross-section area of the local constriction 425 may be at most 0.6 of the cross section of the flow-through channel 410.

The disk 450 with orifices 455 may be mounted in the inlet 415 and may retain bluff body 440 inside the flow-through channel 410. It will be appreciated that the disk 450 with orifices 455 may be replaced with a crosshead, post, propeller or other fixture that may produce a minor loss of pressure.

In one embodiment, the local hydraulic resistance 430 may take the form of a disk 460 having one or more orifices 465. The number of orifices 465 in the disk 460, however, may be varied. The sizes of the orifices 465 in the local hydraulic resistance 430 may be selected in a manner so that the static pressure in the fluid flow before the local hydraulic resistance 430 may reach a static pressure which typically may be at least 0.85 kg/cm$^2$ (12 psi).

As illustrated in FIG. 4, an oxidizing agent may be added to the fluid flow by entering port 470, in the direction of arrow B, and being introduced into the flow by feeding means 475. Generally, the oxidizing agents may be added to the fluid flow at or near an area called a hydrodynamic cavitation cavern 480, which is the area where cavitation bubbles 485 may be in the process of forming. The fluid flow, represented by arrow A, may pass through the local constriction 425 of flow, where the velocity of the fluid flow may increase to a minimum velocity dictated by the physical properties of the hydrodynamic liquid. The minimum velocity may be the velocity at which cavitation bubbles begin to be formed. On average, the minimum velocity may be 16 m/sec (52.5 ft/sec) and greater. Beyond the bluff body 440, the hydrodynamic cavitation cavern 480 may be formed, in the presence of the oxidizing agents that have been introduced, and cavitation bubbles 485 may be generated. The cavitation bubbles 485 may contain and/or be associated with the oxidizing agents. The cavitation bubbles 485 may be transported by the fluid flow toward the outlet 420 from the flow-through channel 410 and, in so flowing, may meet an elevated static pressure zone 495, which may be from 0.85 kg/cm$^2$ (12 psi) and greater, due to the placement of local hydraulic resistance 430 at outlet 420 from flow-through channel 410. The elevated static pressure zone 495 may be called a zone or area of elevated pressure. Flowing into the elevated static pressure zone 495, the cavitation bubbles 485 may collapse, causing high local pressures (e.g., to 5,000 kg/cm$^2$), temperatures (e.g., to 15,000° C.), pulsed ultraviolet light, and others. Under these physical conditions in the fluid, on the boundary of the cavitation bubbles 485 and inside the bubbles themselves, reactions like ultraviolet oxidation may proceed. After passing through the collapsing bubbles zone, the fluid medium may be transported out from the flow-through channel 410 through outlet channel 420 and pipeline 435.

Figure 5:
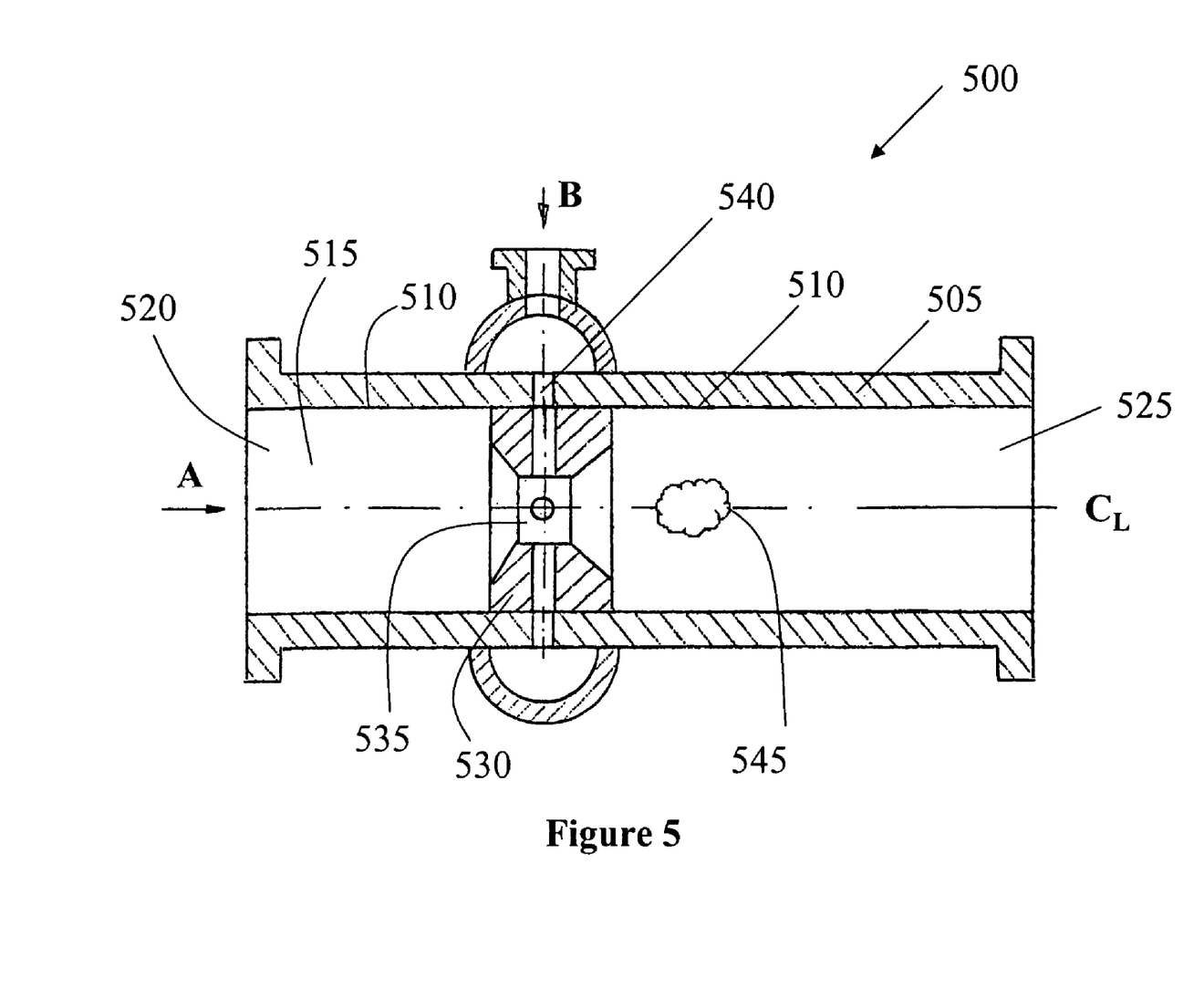
FIG. 5 illustrates a longitudinal cross section of an example device 500 for cavitation-based fluid treatment.

FIG. 5 illustrates a longitudinal cross section of an example device 500 for cavitation-based fluid treatment. The device 500 may include a wall 505 including an inner surface 510 that defines a flow-through channel or chamber 515 having a centerline $C_L$. For example, the wall 505 may be a cylindrical wall that defines a flow-through channel 515 having a circular cross-section. It will be appreciated that the cross-section of the flow-through channel 515 may take the form of other geometric shapes such as square, rectangular, hexagonal, or other shapes. The flow-through channel 515 may further include an inlet 520 configured to introduce a fluid into the device 500 along a path represented by arrow A, and an outlet 525 configured to exit the fluid from the device 500.

With further reference to FIG. 5, in one example, the device 500 may include one or more cavitation generators that may include a locally-constricted area configured to generate a cavitation field that may contain cavitation bubbles, downstream from the locally-constricted area. For example, the device 500 may include a cavitation generator configured as a first plate 530 having an orifice 535 disposed therein, including a locally-constricted area, and designed to produce a local constriction of liquid flow. It will be appreciated that any number of stages of hydrodynamic cavitation may be provided within the flow-through channel 515. Furthermore, it will be appreciated that other types of cavitation generators may be used instead of plates having orifices disposed therein, such as baffles for example.

The plate 530, may be mounted to the wall 510 with screws or other attachment means to retain the plate 530 in the flow-through channel 515. In another example, the plate 530 may include multiple orifices disposed therein to produce multiple local constrictions of fluid flow. It will be appreciated that the plate 530 may be embodied as a disk when the flow-through channel 515 has a circular cross-section, or the plate 530 may be embodied in a variety of shapes and configurations that may match the cross-section of the flow-through channel 515.

To vary the degree and character of the cavitation fields generated downstream from the plate 530, the orifices 535 may be embodied in a variety of different shapes and configurations. The shape and configuration of the orifice 535 may affect the character of the cavitation flow and, correspondingly, one or more of, the amount of ultraviolet light generated, the amount of oxidizing agents ionized, the amount of hydroxyl radicals produced, and the amount of organic substances oxidized, when the cavitation bubbles are collapsed. In one example, the orifice 535 may have a circular cross-section. It will be appreciated that the orifice 535 may be configured in the shape of a Venturi tube, nozzle, orifice of various shapes, slot, and so on. Further, it will be appreciated that the orifice 535 may be embodied in other shapes and configurations, like the ones disclosed in U.S. Pat. No. 5,969,207.

In one example, the orifice 535 disposed in the plate 530 may be configured to generate cavitation bubbles downstream from the orifice 535. The area that contains the formed cavitation bubbles may be called a cavitation field 545.

With further reference to FIG. 5, the flow-through channel 515 may include a port 540 for introducing oxidizing agents into the locally-constricted area. The oxidizing agents may be introduced along a path represented by arrow B. In one example, the port 540 may be disposed in the wall 505 and extended through the plate 530 to permit the introduction of the oxidizing agents into the fluid in or near the orifice, in or near the local constriction of flow. It will be appreciated that more than one port 540 may be provided in the wall 505 to introduce oxidizing agents into the orifice 535 disposed in the plate 530. It will also be appreciated that other configurations of a port 540 or other opening, for example, may be used for introduction of oxidizing agents. Generally, the port 540 or other opening may introduce the oxidizing agent at the local constriction of flow. However, in other examples, the port 540 or other opening may facilitate introduction of oxidizing agents in an area located between the orifice 535 and the cavitation field 545. This area includes the vena contracta, the area immediately downstream from the orifice 535. While not wishing to be bound by a theory, it is believed that formation of the cavitation bubbles occurs in this area and that introduction of oxidizing agents into this area results in significant amounts of oxidizing agents contained within and/or associated with the cavitation bubbles. The port 540 may also facilitate introduction of oxidizing agents immediately upstream of the orifice 535.

The device 500 may also include one or more local hydraulic resistance components (not shown) configured to produce an elevated static pressure zone in a fluid. The elevated static pressure zone may also be called a zone or area of elevated pressure. The local hydraulic resistance components generally may be positioned downstream from the cavitation field 545 and facilitate collapse of the cavitation bubbles due to creation of a zone of elevated pressure. The local hydraulic resistance components may include one or more protrusions, for example, within the flow-through channel 515, downstream of the cavitation field 545. In another example, local hydraulic resistance components may not be part of the device 500, but may be present in another device into which fluid flowing through the device 500 may eventually flow. In another example, local hydraulic resistance components may not be present and cavitation bubbles may collapse without these components.

In operation of the device 500, a fluid may be flowed into the flow-through channel 515 via the inlet 520 along the path in the direction of arrow A. The fluid may be flowed through the flow-through channel 515 and maintained at a flow rate sufficient to generate a hydrodynamic cavitation field 545 downstream from the plate 530. As the fluid flows through the flow-through channel 515, the oxidizing agents may be introduced into the orifice 535, along the direction of arrow B, disposed in the plate 530 via the port 540, thereby creating a high local concentration of oxidizing agents that mixes with the fluid as the fluid passes through the orifice 535 disposed in the plate 530. While passing through the orifice 535 disposed in the plate 530, the velocity of the fluid may increase to a minimum velocity (i.e., velocity at which cavitation bubbles begin to appear) dictated by the physical properties of the liquid. The increased velocity of the fluid may form the hydrodynamic cavitation field 545 downstream from the plate 530, where cavitation bubbles that contain and/or are associated with the oxidizing agents are found. Upon reaching an elevated static pressure zone, the cavitation bubbles may collapse and may produce, for example, ultraviolet light, ionization of the oxidizing agents, hydroxyl radicals, and oxidation of organic substances in the fluid. The fluid may then flow out of the device 500 via the outlet 525.

EXAMPLE

The example is for the purpose of illustrating an embodiment and is not to be construed as a limitation.

Example 1

Removal of Organic Compounds from a Fluid by Cavitation-Based Treatment

Fluids containing various organic substances, as indicated in Table 1, were treated with methods disclosed herein, using a system similar to device 300 illustrated in FIG. 3. The aqueous fluids containing the indicated influent amounts of the organic substances were flowed continuously through the device 300 at a rate of 220 gallons per minute. The indicated oxidizing agents were used. The effluent amounts of the organic substances are indicated.

TABLE 1

| Contaminant | Influent Level | Effluent Level | Oxidant |
|---|---|---|---|
| Phenol | 80 ppm | 0.5 ppm | Hydrogen Peroxide |
| Chlorophenols | 5.0 ppm | 0.2 ppm | Hydrogen Peroxide |
| Benzene | 1.6 ppm | 0.4 ppm | Hydrogen Peroxide |
| Monochlorobenzene | 7.0 ppm | 2.0 ppm | Ozone |
| Tetrachloroethylene | 220 ppm | 0.6 ppm | Ozone |

The results of the example studies, as shown in Table 1, indicate that levels of the various organic contaminants were decreased by the treatment. For example, phenol levels were reduced by over 99%. Chlorophenol levels were reduced by 96%. Benzene levels were reduced by 75%. Monochlorobenzene levels were reduced by over 71%. Tetrachloroethylene levels were reduced by over 99%.

While example systems, methods, and so on have been illustrated by describing examples, and while the examples have been described in considerable detail, it is not the intention of the applicant to restrict or in any way limit the scope of the appended claims to such detail. It is, of course, not possible to describe every conceivable combination of components or methodologies for purposes of describing the methods, systems, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

I claim:

1. A method, comprising:
   flowing a fluid containing an organic compound into a local constriction of flow;
   introducing an oxidizing agent into the fluid at the local constriction of flow producing cavitation bubbles in the fluid, the cavitation bubbles containing, associated with, or containing and associated with, the oxidizing agent; and
   collapsing the cavitation bubbles, thereby producing one or more of degradation and at least partial oxidation of at least some of the organic compound.

2. The method of claim 1, where the oxidizing agent is introduced into the fluid at the a localized area of low pressure at the local constriction of flow.

3. The method of claim 1, where the cavitation bubbles include an amount of the oxidizing agent sufficient to produce an amount of hydroxyl radicals in the presence of ultraviolet light capable of degrading and oxidizing at least some of the organic compound.

4. The method of claim 1, where the oxidizing agent includes one or more of, a gas, a vapor, and a liquid.

5. The method of claim 1, where the oxidizing agent includes one or more of, hydrogen peroxide, peroxide salts, potassium permanganate, active oxygen, and ozone.

6. The method of claim 1, where the flow rate of the oxidizing agent introduced into the local constriction of flow is based on a flow rate of the fluid flowed through the local constriction of flow.

7. The method of claim 1, where hydroxyl radicals produce at least some of the degradation and partial oxidation of at least some of the organic compound.

8. The method of claim 1, where collapsing the cavitation bubbles, at least in part, produces ultraviolet light.

9. The method of claim 8, where the ultraviolet light is produced as short pulses.

10. The method of claim 8, where the ultraviolet light is cavitation luminescence.

11. The method of claim 8, where the ultraviolet light, at least in part, produces hydroxyl radicals in the presence of the oxidizing agent.

12. The method of claim 8, where the ultraviolet light, at least in part, produces ionization of the oxidizing agent.

13. The method of claim 8, where the ultraviolet light, at least in part, produces breakage of one or more chemical bonds in at least some of the organic compound.

14. The method of claim 1, where degradation and at least partial oxidation of the organic compound decreases a concentration of at least some of the organic compound in the fluid.

15. The method of claim 1, where the organic compound includes one or more of, petroleum hydrocarbons, halogenated solvents, phenols, pentachlorophenols, pesticides, dioxins, glycols, polychlorinated biphenyls, explosives, creosote, vinyl chloride, benzenes, toluene, ethylbenzene, xylenes, methyl tertiary butyl ether, cyanide, and mixed organic and radioactive waste.

16. A method for decreasing an amount of organic substances in a liquid, comprising:
    flowing the liquid through a locally-constricted area of a flow-through chamber;
    introducing an oxidizing agent into the liquid the locally-constricted area;
    forming cavitation bubbles based, at least in part, on flow of the liquid through the locally-constricted area, the cavitation bubbles enveloping or associating with at least some of the oxidizing agent;
    collapsing the cavitation bubbles in an elevated pressure zone to ionize at least some of the oxidizing agent; and
    partially oxidizing at least some of the organic substances in the liquid, and thereby decreasing the amount of at least some of the organic substances in the liquid.

17. The method of claim 16, including producing hydroxyl radicals by irradiation of the oxidizing agent enveloped or associated with the cavitation bubbles by ultraviolet light generated during collapse of the cavitation bubbles.

18. The method of claim 17, where the hydroxyl radicals perform one or more of, degradation of at least some of the organic substances in the fluid, and at least partial oxidation of at least some of the organic substances in the fluid.

19. A method of treating an aqueous fluid that contains organic contaminants, the method comprising:
    flowing the aqueous fluid through a flow-through chamber including a local constriction of flow;
    introducing at least one oxidizing agent at the local constriction of flow to mix the aqueous fluid with the at least one oxidizing agent;
    generating cavitation bubbles within the aqueous fluid, the cavitation bubbles containing and associated with at least some of the at least one oxidizing agent;
    collapsing the cavitation bubbles in an elevated pressure zone to create ultraviolet radiation, thereby exposing the oxidizing agent contained or associated with the cavitation bubbles to the ultraviolet radiation, thereby producing hydroxyl radicals; and
    reacting the hydroxyl radicals with at least some of the organic contaminants, thereby producing one or more of degradation and oxidation of at least some of the organic contaminants.

20. A method for decreasing a concentration of organic contaminants in a fluid, comprising:
    flowing the fluid through a cavitation reactor chamber that includes at least one local constriction of flow;
    introducing oxidizing agents that comprise one or more of a gas, a vapor, and a liquid into the cavitation reactor chamber at the local constriction of flow;
    forming cavitation bubbles based, at least in part, on flow of the fluid through the local constriction of flow, at least some of the oxidizing agents being contained within or associated with the cavitation bubbles;
    collapsing the cavitation bubbles in a zone of elevated pressure to produce plasma conditions which emit pulsed ultraviolet radiation, thereby exposing at least part of the oxidizing agents contained within or associated with the cavitation bubbles to the ultraviolet radiation, thereby at least partially ionizing at least some of the oxidizing agents and creating free radicals that perform one or more of, partial oxidation of at least some of the organic contaminants, and cleavage of one or more chemical bonds in at least some of the organic contaminants, thereby decreasing the concentration of the organic contaminants in the fluid.

* * * * *